(12) United States Patent
Kwak et al.

(10) Patent No.: US 12,237,491 B2
(45) Date of Patent: Feb. 25, 2025

(54) MULTI-LAYERED COATING FORMED BY DIFFERENT PROCESSES

(71) Applicant: Ford Global Technologies, LLC, Dearborn, MI (US)

(72) Inventors: Gunho Kwak, Novi, MI (US); Patrick Pietrasz, Rochester, NY (US); Chi Paik, Grosse Ile, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 174 days.

(21) Appl. No.: 17/886,555

(22) Filed: Aug. 12, 2022

(65) Prior Publication Data
US 2024/0055574 A1    Feb. 15, 2024

(51) Int. Cl.
| | |
|---|---|
| *H01M 4/04* | (2006.01) |
| *H01M 4/36* | (2006.01) |
| *H01M 4/02* | (2006.01) |
| *H01M 4/505* | (2010.01) |
| *H01M 4/525* | (2010.01) |
| *H01M 4/62* | (2006.01) |

(52) U.S. Cl.
CPC ....... *H01M 4/0404* (2013.01); *H01M 4/0409* (2013.01); *H01M 4/366* (2013.01); *H01M 2004/021* (2013.01); *H01M 2004/028* (2013.01); *H01M 4/505* (2013.01); *H01M 4/525* (2013.01); *H01M 4/623* (2013.01)

(58) Field of Classification Search
CPC .................................................. H01M 4/0404
See application file for complete search history.

(56) References Cited

U.S. PATENT DOCUMENTS

| | | | |
|---|---|---|---|
| 8,815,468 | B2 | 8/2014 | Paik et al. |
| 2020/0251726 | A1 | 8/2020 | Yao |
| 2020/0266418 | A1 | 8/2020 | Yao |
| 2021/0399286 | A1* | 12/2021 | Xu .................... H01M 4/364 |
| 2022/0102703 | A1* | 3/2022 | Sada ................. H01M 4/0471 |
| 2022/0166000 | A1* | 5/2022 | Yao ................... H01M 10/0525 |
| 2022/0173370 | A1* | 6/2022 | Kong ................ H01M 4/1397 |
| 2022/0181635 | A1* | 6/2022 | Kong ................ H01M 4/0404 |
| 2022/0181684 | A1* | 6/2022 | Xu .................... H01M 10/058 |
| 2023/0108113 | A1* | 4/2023 | Zhong ............... H01M 4/0435 |
| | | | 429/304 |

FOREIGN PATENT DOCUMENTS

KR        102308943 B1    10/2021

* cited by examiner

*Primary Examiner* — Austin Murata
(74) *Attorney, Agent, or Firm* — David B. Kelley; Brooks Kushman P.C.

(57) ABSTRACT

A method for forming one or more layers of a lithium-ion battery includes a step of sequentially depositing a wet coating and a free-standing material layer onto a moving substrate to form a first bilayer on the substrate. The first bilayer including a wet coating-derived layer and the free-standing material layer. The first bilayer is heat roll pressed to form a second bilayer in which the wet coating-derived layer is at least partially dried and adhered to the free-standing material layer.

14 Claims, 3 Drawing Sheets

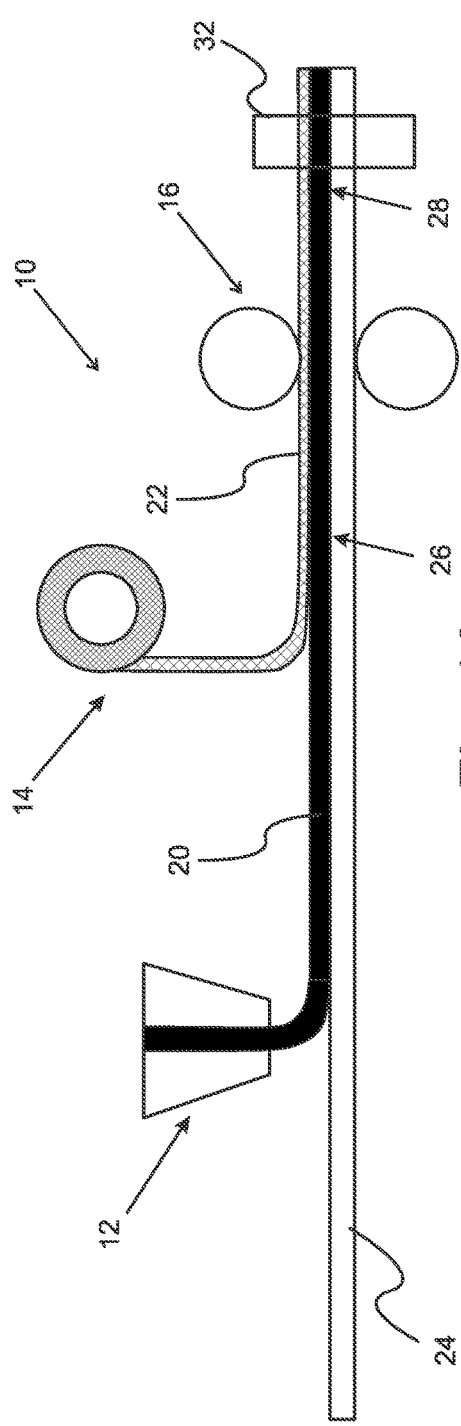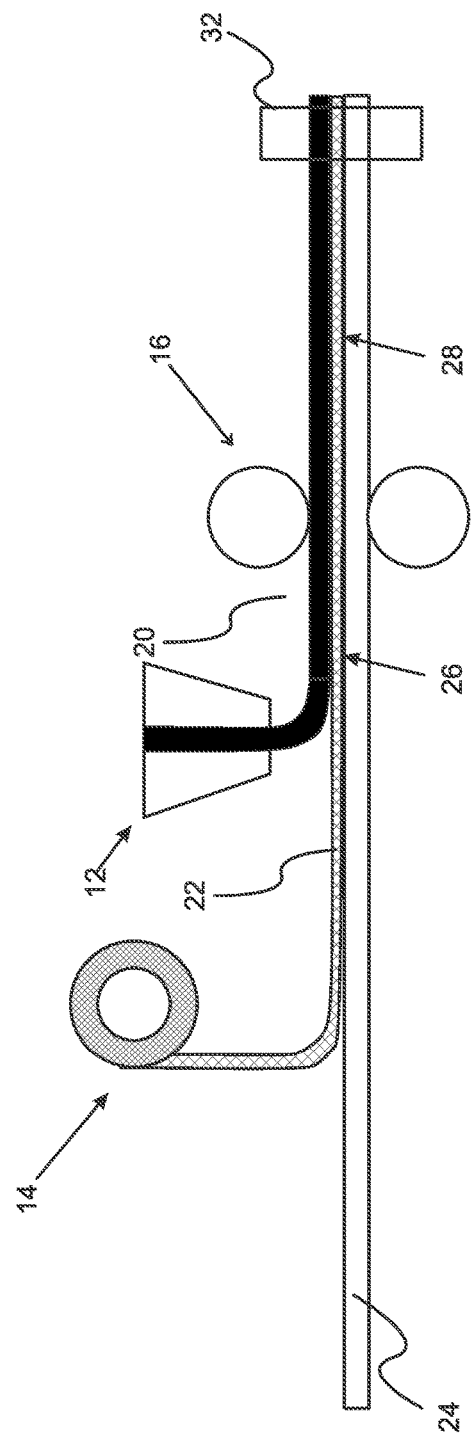

MULTI-LAYERED COATING FORMED BY DIFFERENT PROCESSES

TECHNICAL FIELD

In at least one aspect, a method and system for continuously forming layers for a lithium-ion battery are provided.

BACKGROUND

Multi-layer coatings offer increased performance and allows active material tailoring at higher resolution. Attributes such as high energy and high power are possible with such multi-layer coating. However, the processing of multi-layered may introduce inefficiencies due to repeated, redundant processes. For example, a dual-layer coating of larger and smaller NCM cathode layers may involve running multiple coating steps that can increase process time by at least a factor of two.

Accordingly, there is a need for hybrid processes that efficiently integrate diverse layers and active materials.

SUMMARY

In at least one aspect, a method for forming one or more layers of a lithium-ion battery is provided. The method includes a step of sequentially depositing a wet coating and a free-standing material layer onto a moving substrate to form a first bilayer on the substrate. The first bilayer includes a wet coating-derived layer and the free-standing material layer. The first bilayer is heat roll pressed to form a second bilayer in which the wet coating-derived layer is at least partially dried and adhered to the free-standing material layer.

In another aspect, a multi-layer coating system for continuously forming one or more layers of a lithium-ion battery is provided. The multi-layer coating system includes a wet coating station that deposits depositing a wet coating onto a moving substrate and a free-standing material layer station that applies a free-standing material layer to the wet coating to form a first bilayer. The first bilayer includes a wet coating-derived layer and the free-standing material layer. The multi-layer coating system also includes a heat roll pressing station that heat roll presses the first bilayer to form a second bilayer in which the wet coating-derived layer is at least partially dried and adhered to the free-standing material layer.

The foregoing summary is illustrative only and is not intended to be in any way limiting. In addition to the illustrative aspects, embodiments, and features described above, further aspects, embodiments, and features will become apparent by reference to the drawings and the following detailed description.

BRIEF DESCRIPTION OF THE DRAWINGS

For a further understanding of the nature, objects, and advantages of the present disclosure, reference should be made to the following detailed description, read in conjunction with the following drawings, wherein like reference numerals denote like elements and wherein:

FIG. 1A. Schematic flowchart depicting a method for continuously forming one or more layers of a lithium-ion battery with a multi-layer coating system.

FIG. 1B. Schematic flowchart depicting a method for continuously forming one or more layers of a lithium-ion battery with a multi-layer coating system.

DETAILED DESCRIPTION

Figure 2A:
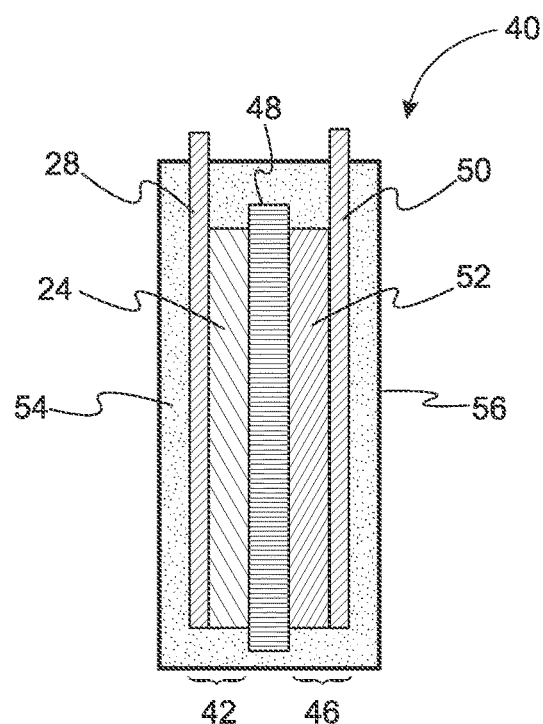
FIG. 2A. Schematic cross-section of a battery cell including the one or more layers of a lithium-ion battery formed by the method of FIG. 1A.

Reference will now be made in detail to presently preferred compositions, embodiments and methods of the present invention, which constitute the best modes of practicing the invention presently known to the inventors. The Figures are not necessarily to scale. However, it is to be understood that the disclosed embodiments are merely exemplary of the invention that may be embodied in various and alternative forms. Therefore, specific details disclosed herein are not to be interpreted as limiting, but merely as a representative basis for any aspect of the invention and/or as a representative basis for teaching one skilled in the art to variously employ the present invention.

Except in the examples, or where otherwise expressly indicated, all numerical quantities in this description indicating amounts of material or conditions of reaction and/or use are to be understood as modified by the word "about" in describing the broadest scope of the invention. Practice within the numerical limits stated is generally preferred. Also, unless expressly stated to the contrary: when a given chemical structure includes a substituent on a chemical moiety (e.g., on an aryl, alkyl, etc.) that substituent is imputed to a more general chemical structure encompassing the given structure; percent, "parts of," and ratio values are by weight; the term "polymer" includes "oligomer," "copolymer," "terpolymer," and the like; molecular weights provided for any polymers refers to weight average molecular weight unless otherwise indicated; the description of a group or class of materials as suitable or preferred for a given purpose in connection with the invention implies that mixtures of any two or more of the members of the group or class are equally suitable or preferred; description of constituents in chemical terms refers to the constituents at the time of addition to any combination specified in the description, and does not necessarily preclude chemical interactions among the constituents of a mixture once mixed; the first definition of an acronym or other abbreviation applies to all subsequent uses herein of the same abbreviation and applies mutatis mutandis to normal grammatical variations of the initially defined abbreviation; and, unless expressly stated to the contrary, measurement of a property is determined by the same technique as previously or later referenced for the same property.

It must also be noted that, as used in the specification and the appended claims, the singular form "a," "an," and "the" comprise plural referents unless the context clearly indicates otherwise. For example, reference to a component in the singular is intended to comprise a plurality of components.

As used herein, the term "about" means that the amount or value in question may be the specific value designated or some other value in its neighborhood. Generally, the term "about" denoting a certain value is intended to denote a range within +/−5% of the value. As one example, the phrase "about 100" denotes a range of 100+/−5, i.e. the range from 95 to 105. Generally, when the term "about" is used, it can be expected that similar results or effects according to the invention can be obtained within a range of +/−5% of the indicated value.

As used herein, the term "and/or" means that either all or only one of the elements of said group may be present. For example, "A and/or B" shall mean "only A, or only B, or both A and B". In the case of "only A", the term also covers the possibility that B is absent, i.e. "only A, but not B".

It is also to be understood that this invention is not limited to the specific embodiments and methods described below, as specific components and/or conditions may, of course, vary. Furthermore, the terminology used herein is used only for the purpose of describing particular embodiments of the present invention and is not intended to be limiting in any way.

The term "comprising" is synonymous with "including," "having," "containing," or "characterized by." These terms are inclusive and open-ended and do not exclude additional, unrecited elements or method steps.

The phrase "consisting of" excludes any element, step, or ingredient not specified in the claim. When this phrase appears in a clause of the body of a claim, rather than immediately following the preamble, it limits only the element set forth in that clause; other elements are not excluded from the claim as a whole.

The phrase "consisting essentially of" limits the scope of a claim to the specified materials or steps, plus those that do not materially affect the basic and novel characteristic(s) of the claimed subject matter.

The phrase "composed of" means "including" or "consisting of" Typically, this phrase is used to denote that an object is formed from a material.

With respect to the terms "comprising," "consisting of," and "consisting essentially of," where one of these three terms is used herein, the presently disclosed and claimed subject matter can include the use of either of the other two terms.

The term "one or more" means "at least one" and the term "at least one" means "one or more." The terms "one or more" and "at least one" include "plurality" and "multiple" as a subset. In a refinement, "one or more" includes "two or more."

The term "substantially," "generally," or "about" may be used herein to describe disclosed or claimed embodiments. The term "substantially" may modify a value or relative characteristic disclosed or claimed in the present disclosure. In such instances, "substantially" may signify that the value or relative characteristic it modifies is within ±0%, 0.1%, 0.5%, 1%, 2%, 3%, 4%, 5% or 10% of the value or relative characteristic.

It should also be appreciated that integer ranges explicitly include all intervening integers. For example, the integer range 1-10 explicitly includes 1, 2, 3, 4, 5, 6, 7, 8, 9, and 10. Similarly, the range 1 to 100 includes 1, 2, 3, 4 . . . 97, 98, 99, 100. Similarly, when any range is called for, intervening numbers that are increments of the difference between the upper limit and the lower limit divided by 10 can be taken as alternative upper or lower limits. For example, if the range is 1.1. to 2.1 the following numbers 1.2, 1.3, 1.4, 1.5, 1.6, 1.7, 1.8, 1.9, and 2.0 can be selected as lower or upper limits.

When referring to a numeral quantity, in a refinement, the term "less than" includes a lower non-included limit that is 5 percent of the number indicated after "less than." For example, "less than 20" includes a lower non-included limit of 1 in a refinement. Therefore, this refinement of "less than 20" includes a range between 1 and 20. In another refinement, the term "less than" includes a lower non-included limit that is, in increasing order of preference, 20 percent, 10 percent, 5 percent, or 1 percent of the number indicated after "less than."

The term "positive electrode" means a battery cell electrode from which current flows out when the lithium-ion battery cell or battery is discharged. Sometimes a "positive electrode" is referred to as a "cathode."

The term "negative electrode" means a battery cell electrode to which current flows in when the lithium-ion battery cell is discharged. Sometimes a "negative electrode" is referred to as an "anode."

The term "cell" or "battery cell" means an electrochemical cell made of at least one positive electrode, at least one negative electrode, an electrolyte, and a separator membrane.

The term "battery" or "battery pack" means an electric storage device made of at least one battery cell. In a refinement, "battery" or "battery pack" is an electric storage device made of a plurality of battery cells.

Abbreviations

"LCO" means lithium cobalt oxide.
"NCM" means lithium nickel cobalt manganese oxide.
"NCMA" means lithium nickel cobalt manganese aluminum oxide.
"NCA" means lithium nickel cobalt aluminum oxide.
"LFP" means lithium iron phosphate.
"LMP" means lithium manganese phosphate.
"LVP" means lithium vanadium phosphate.
"LMO" means lithium manganate.

Referring to FIGS. 1A and 1B, methods for continuously forming one or more layers of a lithium-ion battery with a multi-layer coating system are schematically illustrated. Multilayer coating systems 10 and 10' include a wet coating station 12, a free-standing material layer station 14, and a heat roll pressing station 16. The method includes a step of sequentially depositing a wet coating 20 from the wet coating station 12 and a free-standing material layer 22 from free-standing material layer station 14 onto a moving substrate 24 to form a first bilayer 26 on the substrate. Examples of wet coating stations include slot-die systems, gravure systems, reverse comma systems, and the like. The wet coating system 12 can directly apply to active material slurry onto the moving substrate.

Still referring to FIGS. 1A and 1B, first bilayer 26 includes a wet coating-derived layer and the free-standing material layer. The first bilayer is heat roll pressed by heat roll pressing station 16 to form a second bilayer 28 in which the wet coating-derived layer is at least partially dried. Moreover, the pressing can at least partially adhere the wet coating layer to the free-standing material layer. In a refinement, the first bilayer is (mildly) pressed under heat (e.g., from about 70 to 100° C.) to form the second bilayer. The second bilayer 28 can then be further dried, for example by drier 32. In the variation depicted in FIG. 1A, the wet coating is applied before the free-standing material layer is applied. In another variation as depicted in FIG. 1B, the wet coating is applied after the free-standing material layer is applied. In this variation, surface priming for effective adhesion of the free-standing material layer to the substrate can be implemented.

In a variation, substrate 24 is a current collector. Therefore, substrate 24 can be composed of a metal. Examples of suitable metals include but are not limited to aluminum, copper, platinum, zinc, titanium, and the like. In the case when bilayer 28 includes a positive electrode active material, the current collector is typically composed of aluminum.

In one variation, the wet coating-derived layer includes a first positive electrode active material and the free-standing material layer each includes a second positive electrode active material such that the second bilayer is a positive electrode. In a variation, the primary positive electrode material includes nickel in an amount from about 35 weight percent to about 75 weight percent of the total weight of the primary positive electrode material. In some refinements, the primary positive electrode material includes nickel in an amount of at least 30 weight percent, 35 weight percent, 40 weight percent, 45 weight percent, 50 weight percent, or 55 weight percent of the total weight of the primary positive electrode material and at most in increasing order of preference 99 weight percent, 95 weight percent, 90 weight percent, 85 weight percent, 80 weight percent, or 70 weight percent of the total weight of the primary positive electrode material. In a refinement, the first positive electrode active material can include a component selected from the group consisting of lithium nickel cobalt manganese oxide (NCM), lithium nickel cobalt aluminum oxide (NCM, lithium nickel cobalt manganese aluminum oxide (NCMA), and combinations thereof. In a refinement, the first positive electrode active material is different than the second positive electrode active material. In another refinement, the first positive electrode active material is the same as the second positive electrode active material. In another refinement, the first positive electrode active material has a different average particle size and particle size distribution than the second positive electrode active material. This latter refinement is particularly applicable when the first positive electrode active material is the same as the second positive electrode active material. In a further refinement, the first positive electrode active material has a larger average particle size than the second positive electrode active material.

In another variation, the free-standing material layer includes a dry coating binder. The dry coating binder can include a component selected from the group consisting of polyethylene, polypropylene, polyvinylidene fluoride, polytetrafluoroethylene, and combinations thereof. In a refinement, the dry coating binder has pores of sufficient size to pass lithium ions. The pores can have an average size greater than 50 Å. In a refinement, the pores have an average size greater than 100 Å. In a variation, the wet coating-derived layer includes a positive electrode active material. In a refinement, the second bilayer includes a positive electrode attached to a separator.

With reference to FIG. 2A, a schematic of a rechargeable lithium-ion battery cell that can be constructed from second bilayer 28 of FIG. 1 is provided. Battery cell 40 includes positive electrode 42. Positive electrode 42 includes second bilayer 28 disposed over substrate 24 fabricated in accordance with the method of FIG. 1A. In this variation, second bilayer 28 is the positive electrode active layer and substrate 24 is the positive electrode current collector. Typically, positive electrode current collector is a metal plate or metal foil composed of a metal such as aluminum, copper, platinum, zinc, titanium, and the like. Currently, aluminum is most commonly used for the negative electrode current collector. Battery cell 40 also includes negative electrode 46 and separator 48 interposed between the positive electrode and the negative electrode. Similarly, negative electrode 46 includes a negative electrode current collector 50 and a negative active material layer 52 disposed over and typically contacting the negative electrode current collector. Typically, negative electrode current collector 50 is a metal plate or metal foil composed of a metal such as aluminum, copper, platinum, zinc, titanium, and the like. Currently, copper is most commonly used for the negative electrode current collector. The battery cell is immersed in electrolyte 54 which is enclosed by battery cell case 56. Electrolyte 50 imbibes into separator 36. In other words, the separator 48 includes the electrolyte thereby allowing lithium ions to move between the negative and positive electrodes. The electrolyte includes a non-aqueous organic solvent and a lithium salt. The non-aqueous organic solvent serves as a medium for transmitting ions taking part in the electrochemical reaction of a battery.

Figure 2B:
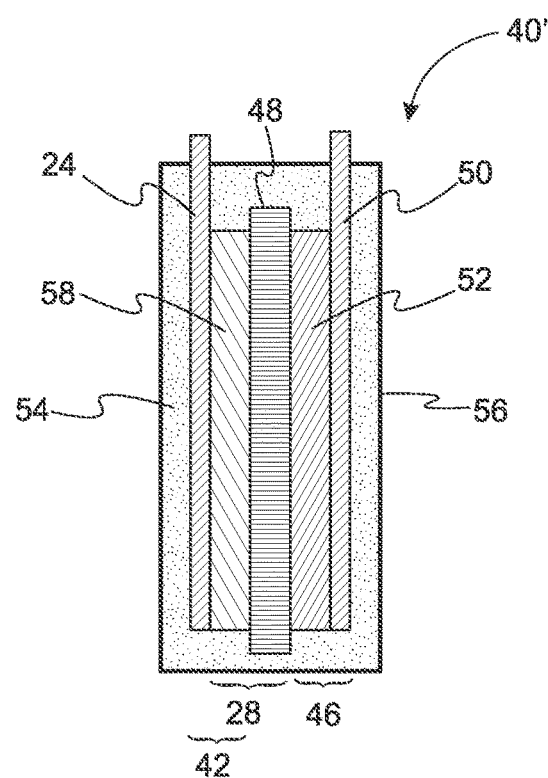
FIG. 2B. Schematic cross-section of a battery cell including the one or more layers of a lithium-ion battery formed by the method of FIG. 1A.

With reference to FIG. 2B, a schematic of a rechargeable lithium-ion battery cell that can be constructed from second bilayer 28 of FIG. 1 is provided. Battery cell 40' includes positive electrode 42. Positive electrode 42 includes second bilayer 28 disposed over substrate 24 fabricated in accordance with the method of FIG. 1A. In this variation, substrate 24 is the positive electrode current collector as described above. Second bilayer 28 includes positive electrode active layer 58 and separator 48. Battery cell 40' also includes negative electrode 46 and separator 48 interposed between the positive electrode and the negative electrode. Similarly, negative electrode 46 includes a negative electrode current collector 50 and a negative active material layer 52 disposed over and typically contacting the negative electrode current collector as set forth above. The battery cell is immersed in electrolyte 54 which is enclosed by battery cell case 56. Electrolyte 50 imbibes into separator 36. In other words, the separator 48 includes the electrolyte thereby allowing lithium ions to move between the negative and positive electrodes. As set forth above, the electrolyte includes a non-aqueous organic solvent and a lithium salt. The non-aqueous organic solvent serves as a medium for transmitting ions taking part in the electrochemical reaction of a battery.

Figure 3:
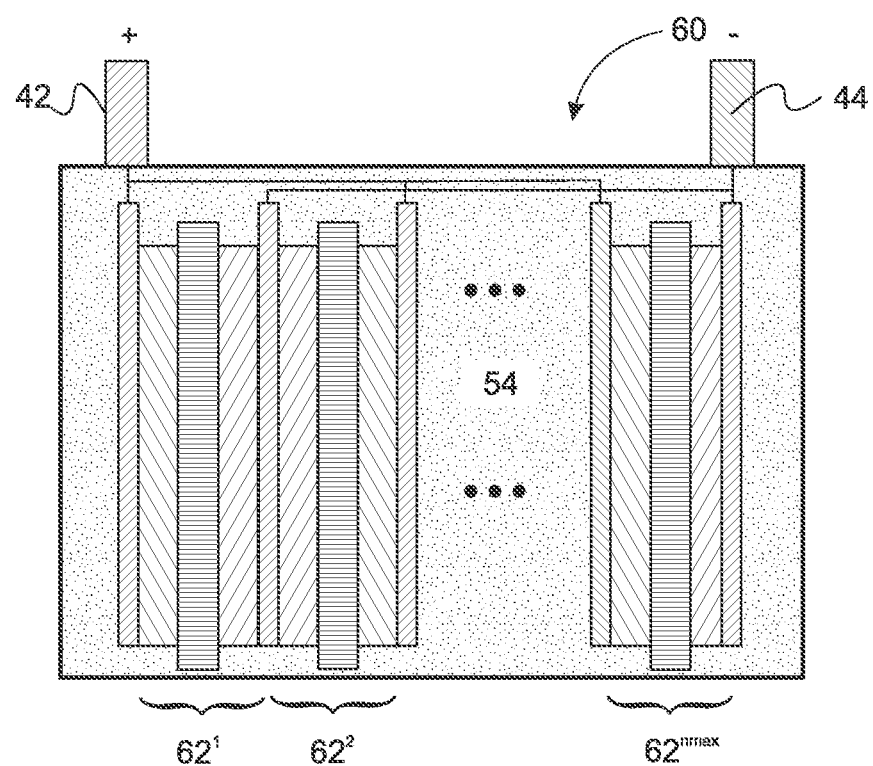
FIG. 3. Schematic cross-section of a battery pack including the battery cells of FIG. 2A or 2B.

With reference to FIG. 3, a schematic of a rechargeable lithium-ion battery incorporating the battery cells of FIGS. 2A-B is provided. Rechargeable lithium-ion battery 60 includes at least one battery cell of the design in FIG. 2. Typically, rechargeable lithium-ion battery 60 includes a plurality of battery cells $62^i$ of the design of FIG. 2A or 2B where i is an integer label for each battery cell. The label i runs from 1 to nmax, where nmax is the total number of battery cells in rechargeable lithium-ion battery 60.

Referring to FIGS. 2A-B and 3, separator 48 physically separates the negative electrode 46 from the positive electrode 32 thereby preventing shorting while allowing the transport of lithium ions for charging and discharging. Therefore, separator 48 can be composed of any material suitable for this purpose. Examples of suitable materials from which separator 48 can be composed include but are not limited to, polytetrafluoroethylene (e.g., TEFLON®), glass fiber, polyester, polyethylene, polypropylene, and combinations thereof. Separator 48 can be in the form of either a woven or non-woven fabric. Separator 36 can be in the form of a non-woven fabric or a woven fabric. For example, a polyolefin-based polymer separator such as polyethylene and/or polypropylene is typically used for a lithium-ion battery. In order to ensure heat resistance or mechanical strength, a coated separator includes a coating of ceramic or a polymer material may be used.

Referring to FIGS. 2 and 3, electrolyte 54 includes a lithium salt dissolved in the non-aqueous organic solvent. Therefore, electrolyte 54 includes lithium ions that can intercalate into the positive electrode active material during charging and into the anode active material during discharging. Examples of lithium salts include but are not limited to $LiPF_6$, $LiBF_4$, $LiSbF_6$, $LiAsF_6$, $LiC_4F_9SO_3$, $LiClO_4$, $LiAlO_2$, $LiAlCl_4$, $LiCl$, $LiI$, $LiB(C_2O_4)_2$, and combinations thereof. In a refinement, the electrolyte includes the lithium salt in an amount from about 0.1 M to about 2.0 M.

Still referring to FIGS. 2 and 3, the electrolyte includes a non-aqueous organic solvent and a lithium salt. Advantageously, the non-aqueous organic solvent serves as a medium for transmitting ions, and in particular, lithium ions participate in the electrochemical reaction of a battery. Suitable non-aqueous organic solvents include carbonate-based solvents, ester-based solvents, ether-based solvents, ketone-based solvents, alcohol-based solvents, aprotic solvents, and combinations thereof. Examples of carbonate-based solvents include but are not limited to dimethyl carbonate, diethyl carbonate, dipropyl carbonate, methylpropyl carbonate, ethylpropyl carbonate, methylethyl carbonate, ethylene carbonate, propylene carbonate, butylene carbonate, and combinations thereof. Examples of ester-based solvents include but are not limited to methyl acetate, ethyl acetate, n-propyl acetate, methylpropionate, ethylpropionate, γ-butyrolactone, decanolide, valerolactone, mevalonolactone, caprolactone, and combinations thereof. Examples of ether-based solvents include but are not limited to dibutyl ether, tetraglyme, diglyme, dimethoxyethane, 2-methyltetrahydrofuran, tetrahydrofuran, and the like, and the ketone-based solvent may include cyclohexanone, and the like. Examples of alcohol-based solvent include but are not limited to methanol, ethyl alcohol, n-propyl alcohol, isopropyl alcohol, and the like. Examples of the aprotic solvent include but are not limited to nitriles such as R—CN (where R is a $C_{2-20}$ linear, branched, or cyclic hydrocarbon that may include a double bond, an aromatic ring, or an ether bond), amides such as dimethylformamide, dioxolanes such as 1,3-dioxolane, sulfolanes, and the like. Advantageously, the non-aqueous organic solvent can be used singularly. In other variations, mixtures of the non-aqueous organic solvent can be used. Such mixtures are typically formulated to optimize battery performance. In a refinement, a carbonate-based solvent is prepared by mixing a cyclic carbonate and a linear carbonate. In a variation, electrolyte 54 can further include vinylene carbonate or an ethylene carbonate-based compound to increase battery cycle life.

Referring to FIGS. 2B and 3, the negative electrode 46 can be fabricated by methods known to those skilled in the art of lithium-ion batteries. The positive electrode is fabricated as shown above. Typically, an active material (e.g., the negative active material) is mixed with a conductive material, and a binder in a solvent (e.g., N-methylpyrrolidone) into an active material composition and coating the composition on a current collector. In the case of the positive electrode, the active material composition is coated using the coating systems described above.

Referring to FIGS. 2A-B and 3, the positive electrode active material layer includes positive electrode active material, a binder, and a conductive material. The positive electrode active materials used herein can be those positive electrode materials known to one skilled in the art of lithium-ion batteries. In particular, the positive electrode may be formed from a lithium-based active material that can sufficiently undergo lithium intercalation and deintercalation. The positive electrode 32 active materials may include one or more transition metals, such as manganese (Mn), nickel (Ni), cobalt (Co), chromium (Cr), iron (Fe), vanadium (V), and combinations thereof. Common classes of positive electrode active materials include lithium transition metal oxides with layered structure and lithium transition metal oxides with spinel phase. Examples of lithium transition metal oxides with layered structure include, but are not limited to lithium cobalt oxide ($LiCoO_2$), lithium nickel oxide ($LiNiO_2$), a lithium nickel manganese cobalt oxide (e.g., $Li(Ni_xMn_yCo_z)O_2$), where $0 \leq x \leq 1$, $0 \leq y \leq 1$, $0 \leq z \leq 1$, and $x+y+z=1$), a lithium nickel cobalt metal oxide (e.g., $LiNi_{(1-x-y)}Co_xMyO_2$), where $0<x<1$, $0<y<1$ and M is Al, Mn). Other known lithium-transition metal compounds such as lithium iron phosphate ($LiFePO_4$) or lithium iron fluorophosphate ($Li_2FePO_4F$) can also be used. In certain aspects, the positive electrode 32 may include an electroactive material that includes manganese, such lithium manganese oxide ($Li_{(1+x)}Mn_{(2-x)}O_4$), a mixed lithium manganese nickel oxide ($LiMn_{(2-x)}Ni_xO_4$), where $0 \leq x \leq 1$, and/or a lithium manganese nickel cobalt oxide.

The binder for the positive electrode active material can increase the binding properties of positive electrode active material particles with one another and with the positive electrode current collector 42. Examples of suitable binders include but are not limited to polyvinyl alcohol, carboxylmethyl cellulose, hydroxypropyl cellulose, diacetyl cellulose, polyvinylchloride, carboxylated polyvinylchloride, polyvinylfluoride, an ethylene oxide-containing polymer, polyvinylpyrrolidone, polyurethane, polytetrafluoroethylene, polyvinylidene fluoride, polyethylene, polypropylene, a styrene-butadiene rubber, an acrylate styrene-butadiene rubber, an epoxy resin, nylon, and the like, and combinations thereof. The conductive material provides positive electrode 10 with electrical conductivity. Examples of suitable electrically conductive materials include but are not limited to natural graphite, artificial graphite, carbon black, acetylene black, ketjen black, carbon fibers, copper, metal powders, metal fibers, and combinations thereof. Examples of metal powders and metal fibers are composed of including nickel, aluminum, silver, and the like.

Referring to FIGS. 2A-B and 3, the negative active material layer 52 includes a negative active material, includes a binder, and optionally a conductive material. The negative active materials used herein can be those negative materials known to one skilled in the art of lithium-ion batteries. Negative active materials include but are not limited to, carbon-based negative active materials, silicon-based negative active materials, and combinations thereof. A suitable carbon-based negative active material may include graphite and graphene. A suitable silicon-based negative active material may include at least one selected from silicon, silicon oxide, silicon oxide coated with conductive carbon on the surface, and silicon (Si) coated with conductive carbon on the surface. For example, silicon oxide can be described by the formula $SiO_z$ where z is from 0.09 to 1.1. Mixtures of carbon-based negative active materials, silicon-based negative active materials can also be used for the negative active material.

The negative electrode binder increases the binding properties of negative active material particles with one another and with a current collector. The binder can be a non-aqueous binder, an aqueous binder, or a combination thereof. Examples of non-aqueous binder may be polyvinylchloride, carboxylated polyvinylchloride, polyvinylfluoride, an ethylene oxide-containing polymer, polyvinylpyrrolidone, polyurethane, polytetrafluoroethylene, polyvinylidene fluoride, polyethylene, polypropylene, polyamideimide, polyimide, or a combination thereof. Aqueous binders can be rubber-based binders or polymer resin binders. Examples of rubber-based binders include but are not limited to styrene-butadiene rubbers, acrylated styrene-butadiene rubbers, acrylonitrile-butadiene rubbers, acrylic rubbers, butyl rubbers, fluorine rubbers, and combinations thereof. Examples of polymer resin binders include but are not limited to polyethylene, polypropylene, ethylenepropylene copolymer, polyethyleneoxide, polyvinylpyrrolidone, epichlorohydrin, polyphosphazene, polyacrylonitrile, polystyrene, ethylenepropylenediene copolymer, polyvinylpyridine, chlorosulfonated polyethylene, latex, a polyester resin, an acrylic resin, a phenolic resin, an epoxy resin, polyvinyl alcohol and combinations thereof.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. A method for forming one or more layers of a lithium-ion battery comprising:
   sequentially depositing a wet coating and a free-standing material layer onto a moving substrate to form a first bilayer on the moving substrate, the first bilayer including a wet coating-derived layer and the free-standing material layer, the moving substrate being composed of a metal, wherein the moving substrate is a current collector; and
   heat roll pressing the first bilayer to form a second bilayer in which the wet coating-derived layer is at least partially dried and adhered to the free-standing material layer, wherein the wet coating-derived layer includes a first positive electrode active material and the free-standing material layer each includes a second positive electrode active material such that the second bilayer is a positive electrode.

2. The method of claim 1, wherein the wet coating is applied before the free-standing material layer is applied.

3. The method of claim 1, wherein the wet coating is applied after the free-standing material layer is applied.

4. The method of claim 1, wherein the first positive electrode active material includes a component selected from the group consisting of lithium nickel cobalt manganese oxide (NCM), lithium nickel cobalt aluminum oxide (NCA), lithium nickel cobalt manganese aluminum oxide material (NCMA), and combinations thereof.

5. The method of claim 1, wherein the first positive electrode active material is different than the second positive electrode active material.

6. The method of claim 1, wherein the first positive electrode active material is the same as the second positive electrode active material.

7. The method of claim 6, wherein the first positive electrode active material has a different average particle size and particle size distribution than the second positive electrode active material.

8. The method of claim 6, wherein the first positive electrode active material has a larger average particle size than the second positive electrode active material.

9. The method of claim 1, wherein the free-standing material layer includes a dry coating binder.

10. The method of claim 9, wherein the dry coating binder includes a component selected from the group consisting of polyethylene, polypropylene, polyvinylidene fluoride, polytetrafluoroethylene, and combinations thereof.

11. The method of claim 10, wherein the dry coating binder has pores of sufficient size to pass lithium ions.

12. The method of claim 11, wherein the pores have an average size greater than 50 Å.

13. The method of claim 9, wherein the wet coating-derived layer includes a positive electrode active material.

14. The method of claim 13, wherein the second bilayer includes a positive electrode attached to a separator.

* * * * *